United States Patent [19]
Hildebrand et al.

[11] Patent Number: 5,991,084
[45] Date of Patent: Nov. 23, 1999

[54] COMPACT COMPOUND MAGNIFIED VIRTUAL IMAGE DISPLAY WITH A REFLECTIVE/TRANSMISSIVE OPTIC

[75] Inventors: Alfred P. Hildebrand, Palo Alto; Gregory J. Kintz, Mountain View, both of Calif.

[73] Assignee: Inviso, Sunnyvale, Calif.

[21] Appl. No.: 09/018,259

[22] Filed: Feb. 4, 1998

[51] Int. Cl.$^6$ .................................................. G02B 27/14
[52] U.S. Cl. ......................... 359/629; 359/630; 359/634
[58] Field of Search ..................................... 359/630–634, 359/629; 345/7–8

[56] References Cited

U.S. PATENT DOCUMENTS

| | | | |
|---|---|---|---|
| 5,530,586 | 6/1996 | Yasugski | 359/364 |
| 5,587,836 | 12/1996 | Takahashi et al. | 359/630 |
| 5,764,403 | 6/1998 | Downing | 359/326 |
| 5,771,124 | 6/1998 | Kintz et al. | 359/633 |
| 5,870,068 | 2/1999 | Hildebrand et al. | 345/8 |

*Primary Examiner*—Georgia Epps
*Assistant Examiner*—Michael A Lucas
*Attorney, Agent, or Firm*—David J. Weitz; Wilson Sonsini Goodrich & Rosati

[57] ABSTRACT

A compact virtual image display system is provided which includes a microdisplay; a first magnification optic consisting of three surfaces: a display input surface; a reflective/transmissive surface, and a reflective first magnification element surface; and a second magnification optic. Light forming the source object enters the first magnification optic at the display input surface. The light travels within the first magnification optic such that it is projected to an area on the reflective\transmissive surface that is at least partially within the full field of view provided by the second magnification optic. The light is directed to the reflective/transmissive surface at a first angle of incidence $\theta_{SO}$ relative to the reflective/transmissive surface such that the light is internally reflected by the reflective/transmissive surface and directed to the reflective first magnification element surface. The first magnification element surface internally reflects the light corresponding to the source object as a magnified virtual image. The magnified virtual image is then is conveyed within the first magnification optic back to the reflective/transmissive surface at a second angle of incidence $\theta_{MVI}$ relative to the reflective/transmissive surface such that the light is transmitted by the reflective/transmissive surface out of the first magnification optic. The second magnification optic is positioned to receive the magnified virtual image transmitted from the first magnification optic and transmit a compound magnified virtual image of the magnified virtual image of the source object to the observer.

42 Claims, 11 Drawing Sheets

COMPACT COMPOUND MAGNIFIED VIRTUAL IMAGE DISPLAY WITH A REFLECTIVE/TRANSMISSIVE OPTIC

BACKGROUND OF THE INVENTION

1. Field of the Invention

The invention generally relates to a compact display system. More specifically, the invention relates to a compact display system which provides a virtual image of a microdisplay that has been magnified using two stages of magnification optics where one of the magnification optics is reflective and is used to fold the optical train of the display onto itself.

2. Description of Related Art

A continuing objective in the field of electronics is the miniaturization of electronic devices. Most electronic devices include an electronic display. As a result, the miniaturization of electronic displays is critical to the production of a wide variety of compact electronic devices.

The purpose of an electronic display is to provide the eye with a visual image of certain information. This visual image may be provided as either a real image or a virtual image. A real image refers to an image which is observed directly by the unaided human eye. A photograph is an example of a real image. Electronic displays which provide a real image generally provide some form of display surface on which the real image is formed and viewed. A real image exists at a given location when, if a viewing surface is positioned at this location, a real image can be observed by the unaided eye. Examples of electronic displays which provide real images include liquid crystal displays, CRT monitors, and projection screens.

By contrast to a real image, a virtual image is an image which, if a viewing surface were positioned at the location of the virtual image, no image would be observed by the eye. An example of a virtual image is the image of fine print viewed through a magnifying glass. The print not only appears larger, it also appears to be located substantially behind the surface where the print actually exists. By definition, a virtual image can exist at a location where no display surface exists. The size of the virtual image therefore is not limited by the size of a display surface. Virtual image electronic displays thus have the advantage of eliminating the need for a large display surface in order to produce a large electronic image.

A virtual image electronic display must initially form a source object which is then imaged by an optical system to create the virtual image. A substantial advantage of a virtual image electronic display is that the source object initially created may be as small as can be usefully reimaged by the optical system. As a result, virtual image electronic displays may effectively utilize very small microdisplays to form the source object. Pixel sizes may be as small as a few microns in diameter, a size which the unaided eye cannot resolve. Rather, in order to view the source object formed by the microdisplay, substantial magnification of the optical system is required.

A virtual image must be created by an optical system of some kind. In a real image electronic display, it is the eye and the viewing surface properties which determine the viewing parameters. By contrast, in a virtual image display, the optical system determines most of the viewing parameters.

There are three important parameters relating to the ease of viewing the image associated with virtual image displays.

The first parameter is the far point which refers to the maximum distance from the eye which the optical system can be held and have the eye still see the entire virtual image. Optical devices which provide a far point which is a short distance from the optic are undesirable due to the inconvenience and discomfort associated with placing the eye in close proximity with the optic. It is therefore preferred that an optic provide a long far point in order to enable the magnified image to be viewed through the optic at a comfortable and convenient range of distances from the optic.

The second parameter relating to the ease of viewing a virtual image is the apparent angular width of the virtual image, commonly referred to as the field of view of the virtual image. The full field of view is defined as the ratio of the largest apparent dimension of the virtual image to the apparent distance to the virtual image. It is generally equivalent to the field of view for a real image display surface.

The third parameter relating to the ease of viewing a virtual image is the transverse distance that the eye may move with respect to the optical system and still have the eye see the entire virtual image through the optical system.

A need currently exists for an inexpensive, compact virtual image electronic display that is positionable within a small volume, that provides the observer with a large field of view, a virtual image with a significant degree of eye relief and a large translational distance. In particular, an electronic display system is currently needed which combines the image quality and light efficiency advantages of an on-axis display system with the spacial efficiency provided by off-axis display systems.

A significant advantage associated with compact electronic displays is the fact that they are portable. It is therefore impractical and disadvantageous for a compact electronic display to rely on an external power source. The illumination source used in the electronic display generally requires the greatest amount of energy of the various components used in the electronic display. It is therefore important that the electronic display have an optical design which efficiently uses the illumination source used to form the virtual image.

SUMMARY OF THE INVENTION

The present invention relates to a compact virtual image display system which includes a microdisplay; a first magnification optic consisting of three surfaces: a display input surface; a reflective/transmissive surface, and a reflective first magnification element surface; and a second magnification optic. Light forming the source object enters the first magnification optic at the display input surface. The light travels within the first magnification optic such that it is projected to an area on the reflective\transmissive surface that is at least partially within the full field of view provided by the second magnification optic. The light is directed to the reflective/transmissive surface at a first angle of incidence $\theta_{SO}$ relative to the reflective/transmissive surface such that the light is reflected by the reflective/transmissive surface and directed to the reflective first magnification element surface. The first magnification element surface reflects the light corresponding to the source object as a magnified virtual image. The magnified virtual image is then is conveyed within the first magnification optic back to the reflective/transmissive surface at a second angle of incidence $\theta_{MVI}$ relative to the reflective/transmissive surface such that the light is transmitted by the reflective/transmissive surface out of the first magnification optic. The second magnification optic is positioned to receive the magnified virtual image transmitted from the first magnification optic and transmit a compound magnified virtual image of the magnified virtual image of the source object to the observer.

The microdisplay may be any electronically controllable microdisplay. The microdisplay may be transmissive or opaque. Examples of different types of opaque microdisplays include reflective, emissive and scattering. The microdisplay preferably forms a source object having an area equal to or less than 400 mm$^2$. The microdisplay is also preferably formed of an array of pixels where each pixel has an area equal to or less than about 0.25 mm$^2$.

In all of the above embodiments, the display system can be designed such that the thickness, as measured from a surface of the first magnification optic facing away from the second magnification optic to a surface of the second magnification optic facing away from the first magnification optic, is equal to or less than about 20 mm.

In all of the above embodiments, the first and second magnification optics are preferably selected such that the second magnification optic reduces the degree of field curvature introduced by the first magnification optic and preferably substantially eliminates field curvature introduced by the first magnification optic.

The above described display systems may also include an eye position sensor system which enables the observer to use his or her eye to interact with a control device which controls the source object produced by the microdisplay and/or functions that the display system performs.

DESCRIPTION OF THE PREFERRED EMBODIMENTS

Figure 1:
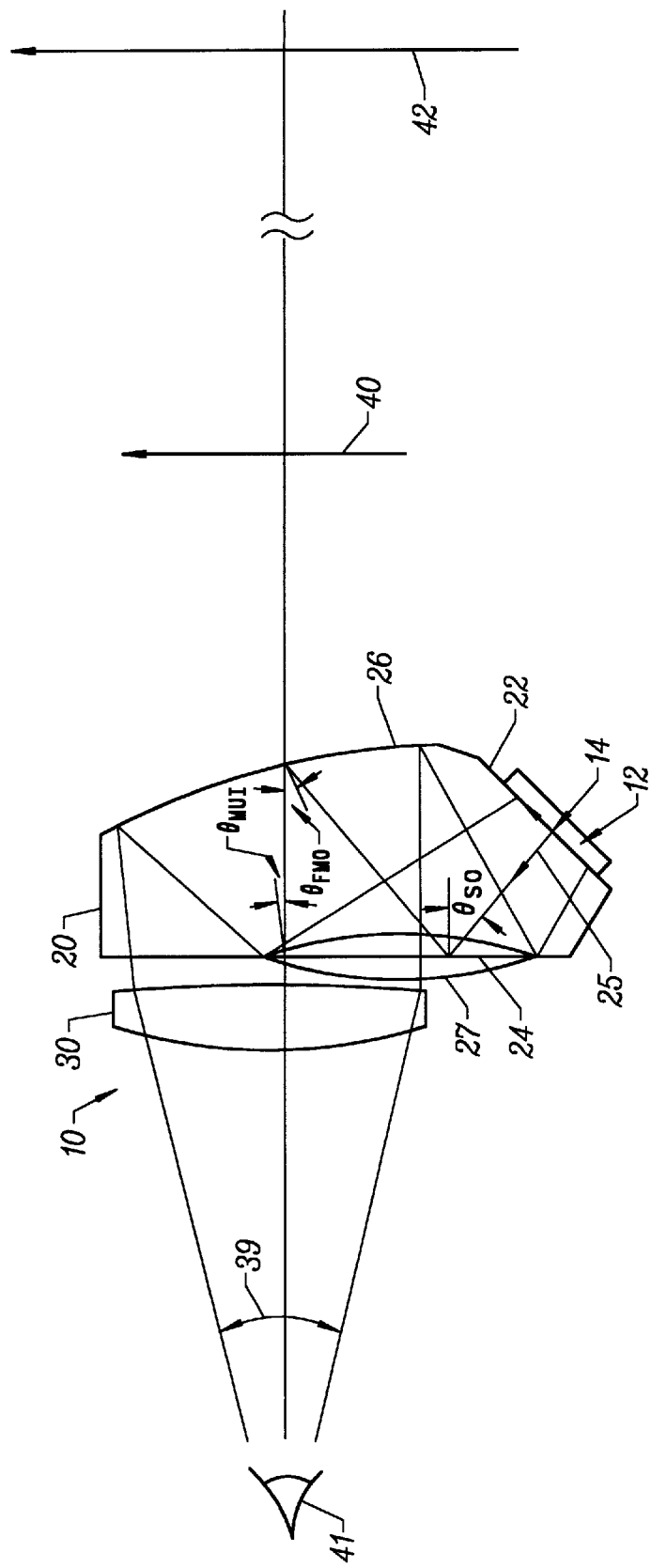
FIG. 1 illustrates a display system according to the present invention in which the microdisplay and display input surface are positioned adjacent the first magnification surface such that the source object produced by the microdisplay is projected directly to the reflective/transmissive optic.
Figure 2:
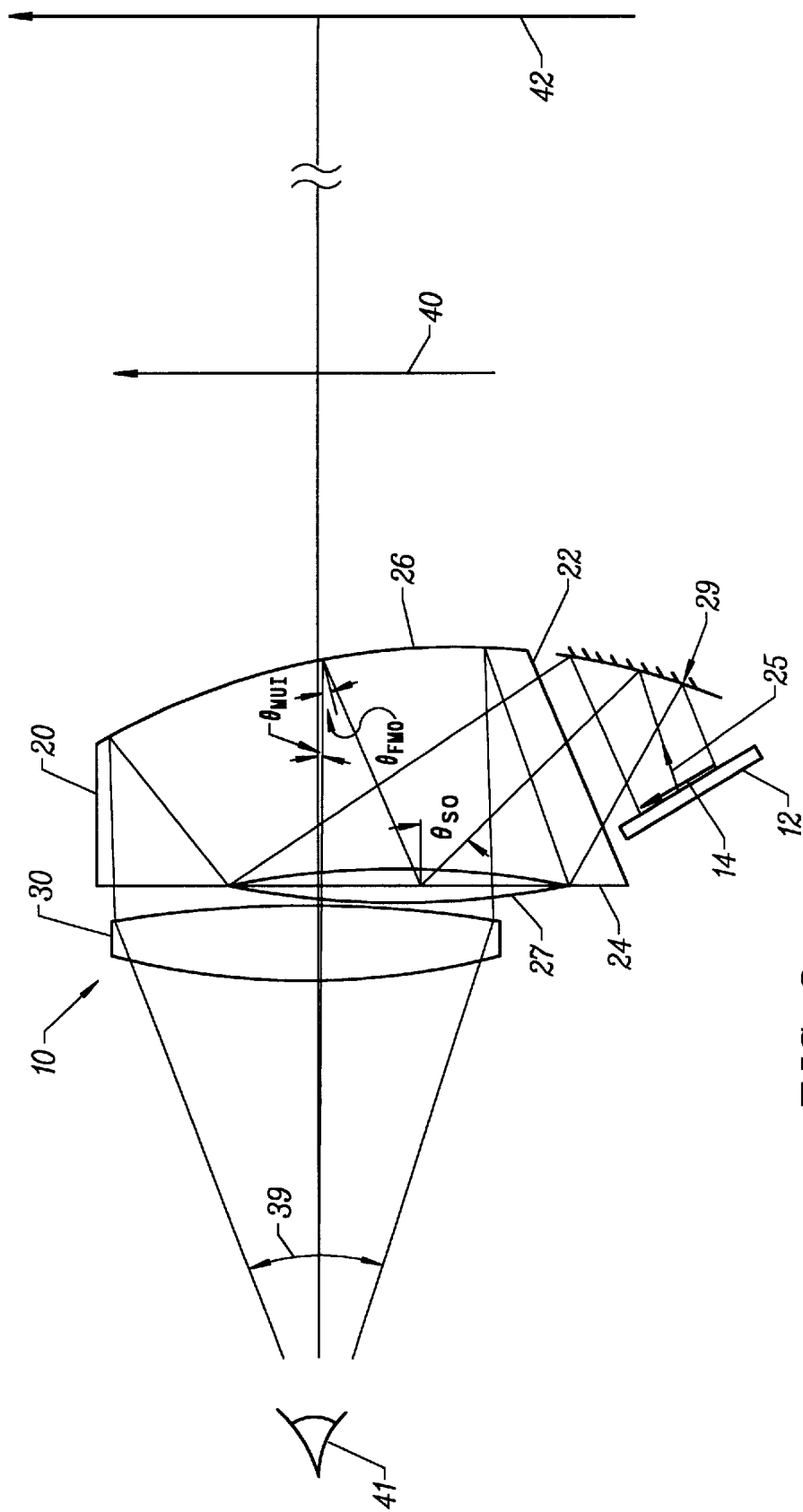
FIG. 2 illustrates a display system according to the present invention in which the light forming the source object is reflected off a reflective surface and directed the display input surface.
Figure 3:
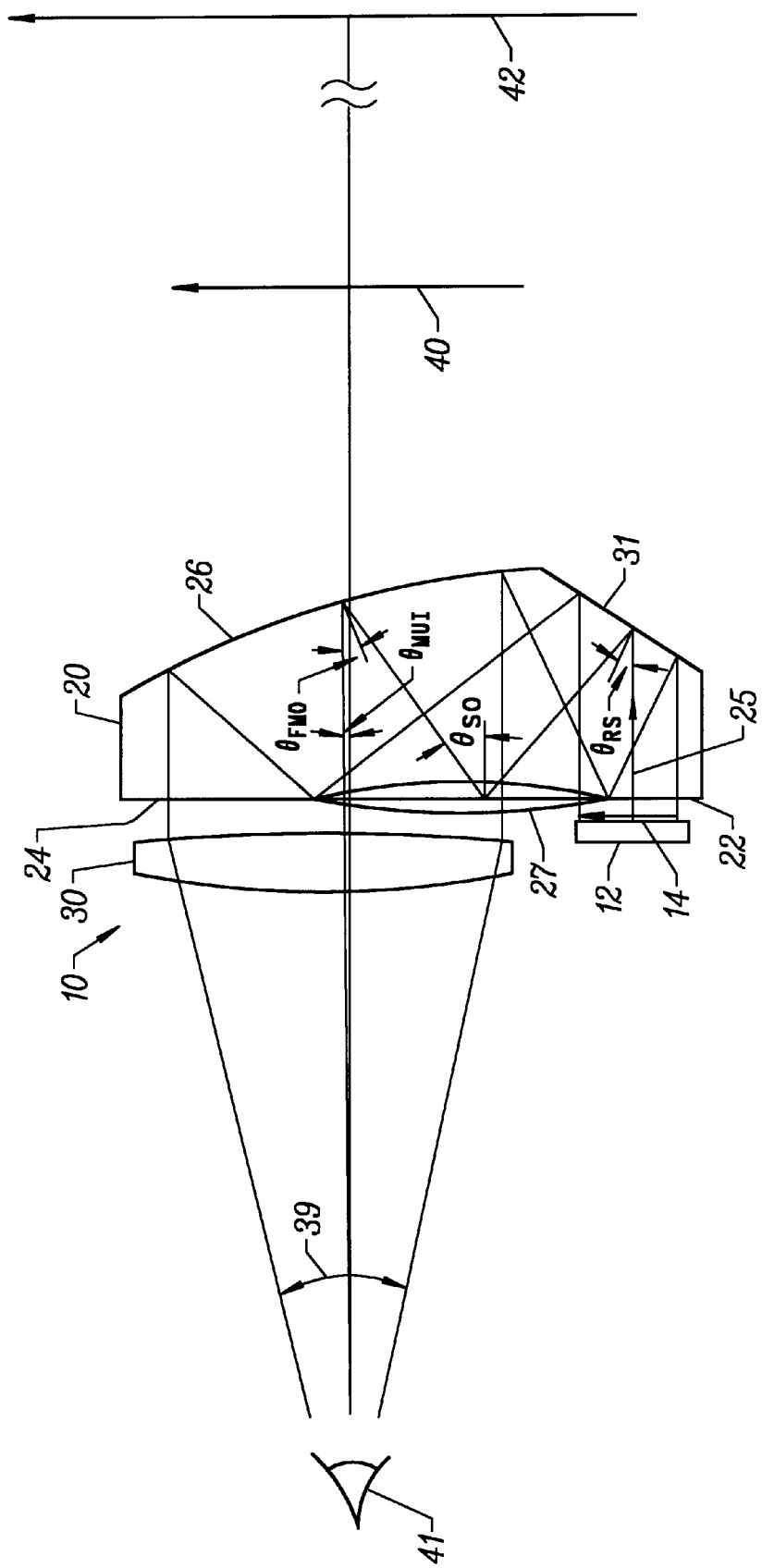
FIG. 3 illustrates a display system according to the present invention in which the first magnification optic includes a reflective surface which reflects light entering the first magnification optic through the display input surface and directs the light to the reflective/transmissive surface.

The present invention relates to an inexpensive, compact virtual image display system which provides a magnified virtual image of a source object using two magnification optics where one of the magnification optics is used to fold the optical train of the display onto itself, thereby enabling the display system to be housed in a compact volume. More specifically, as illustrated in FIGS. 1–3, the present invention provides a virtual image display system 10 which includes a microdisplay 12 for producing a source object 14; a first magnification optic 20 which has three surfaces: a display input surface 22, a reflective/transmissive surface 24, and a reflective first magnification element surface 26; and a second magnification optic 30. Light 25 forming the source object enters the first magnification optic 20 at the display input surface 22. The light travels within the first magnification optic 20 such that it is projected to an area 27 on the reflective/transmissive surface 24 that is at least partially within the full field of view 39 provided by the second magnification optic 30. The light 25 is directed to the reflective/transmissive surface 24 at a first angle of incidence $\theta_{SO}$ relative to the reflective/transmissive surface 24 such that the light is reflected by the reflective/transmissive surface 24 and directed to the reflective first magnification element surface 26. The first magnification element surface 26 reflects the light corresponding to the source object 14 as a magnified virtual image 40. The magnified virtual image 40 is then is conveyed within the first magnification optic back to the reflective/transmissive surface 24 at a second angle of incidence $\theta_{MVI}$ relative to the reflective/transmissive surface 24 such that the light is transmitted by the reflective/transmissive surface 24 out of the first magnification optic 20. The second magnification optic 30 is positioned to receive the magnified virtual image 40 transmitted from the first magnification optic 20 and transmit a compound magnified virtual image 42 of the magnified virtual image 40 of the source object 14 to the observer 41.

As illustrated in FIG. 1, the microdisplay 12 and the display input surface 22 can be positioned adjacent the first magnification surface 26 such that the source object 14 produced by the microdisplay 12 is projected directly to the reflective/transmissive optic 24. An alternate embodiment of the display system where the light 25 forming the source object is reflected off a reflective surface 29 and directed the display input surface 22 is illustrated in FIG. 2.

In FIGS. 1 and 2, the display input surface 22 is illustrated as being on a side opposing the reflective/transmissive surface 24. Alternatively as illustrated in FIG. 3, the first magnification optic can include a reflective surface 31 which reflects light entering the first magnification optic through the display input surface 22 and directs the light to the reflective/transmissive surface 24. In this embodiment, the display input surface 22 is moved to be adjacent to and preferably coincident with the reflective/transmissive optical surface 24. The new second reflective surface 31 is adjacent to the reflective first magnification surface.

One advantage of the design illustrated in FIG. 3 is that it simplifies the coating of the first magnification optic 20. A highly reflective coating such as aluminum can be applied simultaneously to both the second reflective surface 31 and the reflective first magnification surface 26. In addition, the display input surface 22 and the reflective/transmissive surface 24 can be coated simultaneously.

The relative alignment of the first and second magnification optics 26, 30 in all of these embodiments is preferably such that the source object 14 is projected from an area 27 on the reflective/transmissive optic surface that is at least partially within the full field of view provided by the second magnification optic 30. As a result of this design for the display system, the spacing between the components employed in the display system of the present invention is significantly reduced such that the display can be positioned within a small space. For example, the spacing between the first and second magnification optic can be reduced to less than about 15 mm and preferably less than about 8 mm. As a result, the thickness of the display system along the first optical axis can be reduced to less than about 20 mm and preferably less than about 10 mm.

As used herein, full field of view refers to the entire circular field of view provided by the second magnification optic if nothing is blocking the optical view of the second magnification optic. Accordingly, the full field of view is not reduced in size by positioning elements which block a portion of the field of view.

The use of a reflective/transmissive surface 24 as it is used in the present invention increases the light efficiency of the display system by avoiding light loss that would otherwise occur with the use of beam splitters, optical gratings, holograms, or other redirecting optics between the first and second magnification optics. In addition, by using a first and second magnification optic, each optic may be selected to correct aberrations introduced by the other optic including, but not limited to spherical aberrations, astigmatism, coma, distortion and field curvature.

The use of two stages of magnification in the present invention also enables the size of the components used in the display system to be reduced in size. In the present invention, the display system is preferably positionable within a volume equal to or less than about 75 cubic centimeters, most preferably equal to or less than about 37.5 cubic centimeters.

The display systems of the present invention are intended as an inexpensive electronic component which may be incorporated into any electronic device in which a display system is used. In particular, the display system is designed for use in pocket-sized electronic devices. Examples of such devices include, but are not limited to, portable computers, personal communicators, personal digital assistants, modems, pagers, video and camera viewfinders, mobile phones, television monitors and other hand held devices.

As illustrated in FIGS. 1–3, at least a portion of the light forming the source object 14 that is projected toward the second magnification optic 30 is reflected by the reflective/transmissive optical surface 24 toward the reflective first magnification element surface 26. Meanwhile, at least a portion of the light reflected from the reflective first magnification element surface 26 to form the magnified virtual image 40 is transmitted through the reflective/transmissive optic 24 to the second magnification optic 30.

The normal 31 to the center of curvature of the reflective first magnification element surface 26 is positioned at an angle $\theta_{FMO}$ relative to the normal 29 to the center of compound virtual image.

The angle ($\theta_{FMO}$) of the reflective first magnification element surface 26 relative to the normal 29 to the center of the compound virtual image is preferably between about 10° and 25°, most preferably about 18°. At larger angles, significant aberrations in the compound magnified image are produced. Meanwhile, at angles less than about 10°, the reflective first magnification element surface 26 is not sufficiently angled relative to the second magnification optic 30 to enable the microdisplay 12 to be positioned out from between the first and second magnification optics 20, 30.

Figure 4A:
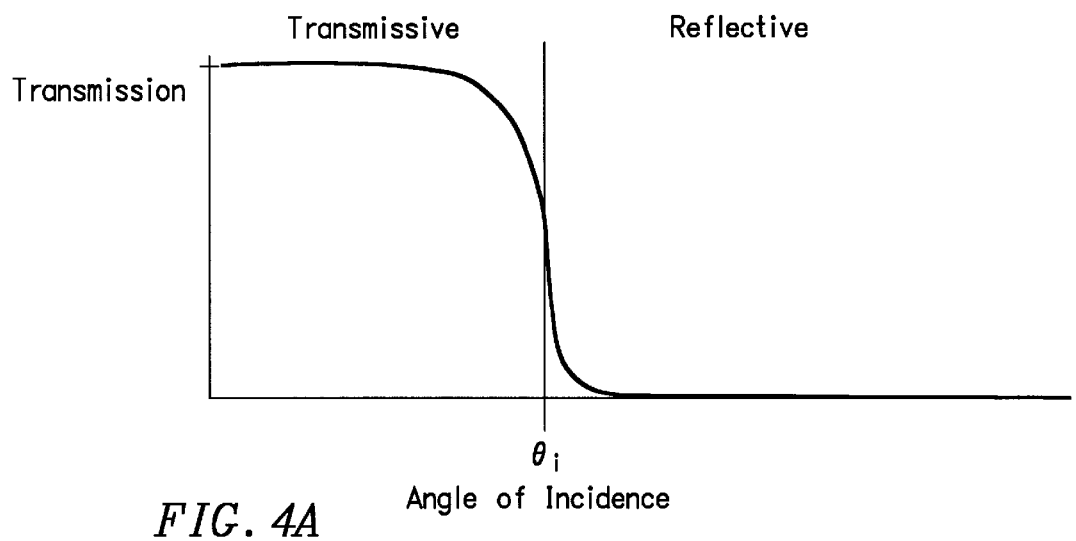
FIG. 4A shows a plot of transmission as a function of the angle of incidence for light passing from air into the first magnification optic.
Figure 4B:
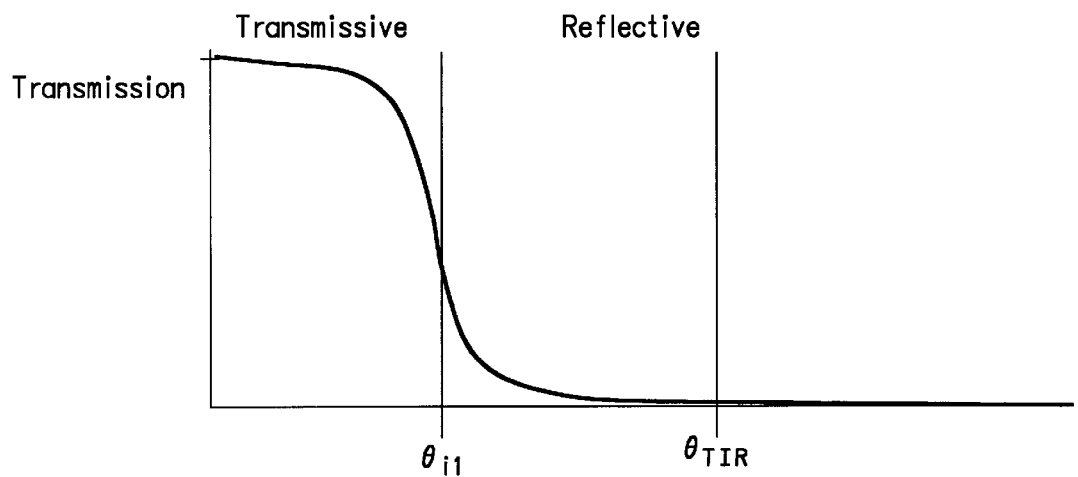
FIG. 4B shows transmission as a function of the angle of incidence for light passing from within the first magnification optic into air.

In a preferred embodiment, the reflective/transmissive optical surface 24 has an optical property as illustrated in FIGS. 4A and 4B where the reflective/transmissive optical surface 24 is reflective to light above a certain angle of incidence $\theta_i$ and transmissive below the angle of incidence $\theta_i$. FIG. 4A shows a plot of transmission as a function of the angle of incidence for light passing from air into the first magnification optic. FIG. 4B shows transmission as a function of the angle of incidence for light passing from within the first magnification optic into air. In FIG. 4B, the angle at which total internal reflection occurs is shown for angles greater than the angle marked $\theta_{TIR}$. The angle of total internal reflection can be calculated from the index of refraction of the material by the formula $\theta_{TIR}=\sin^{-1}(1/n)$, where n is the index of refraction of the material forming the compound optical element. The angle corresponding to $\theta_i$ on FIG. 4A and $\theta_{i1}$ on FIG. 4B can be calculated using Snell's Law. The relationship is $\sin(\theta_i)=n*\sin(\theta_{i1})$, where n is the index of refraction of the material forming the compound optical element. As a result, light forming the source object 14 that is projected toward the reflective/transmissive surface 24 at an angle ($\theta_{SO}$) relative to the normal 37 to the reflective/transmissive surface 24 that is greater than the angle $\theta_{i1}$ is reflected by the reflective/transmissive surface 24 toward the reflective first magnification element surface 26. Meanwhile, light forming the magnified virtual image 40 that is projected 35 toward the reflective/transmissive surface 24 at an angle ($\theta_{MVI}$) that is smaller than $\theta_{i1}$ is transmitted by the reflective/transmissive optic 24 to the second magnification optic 30.

The use of a reflective/transmissive surface 24 with a coating having the reflective/transmissive properties illustrated in FIG. 4A enhances the light efficiency of the display system relative to the use of a beamsplitter as the reflective/transmissive optic 24. Examples of coatings having these reflective/transmissive properties include, but are not limited to dielectric coating. For most coatings, the angle $\theta_i$ is about 30° and angle $\theta_{i1}$ is about 20° for a medium where the index of refraction is about 1.5.

Use of a first magnification optic where light travels between the reflective/transmissive surface 24 and the reflective first magnification element surface 26 within a medium having a refractive index greater than air enables the angle of incidence at which the reflective/transmissive surface 24 becomes reflective to be reduced. This enables greater folding of the display system to be achieved. As the angle of incidence at which the light is reflected is reduced, the amount of aberrations introduced into the image is reduced.

In all embodiments where a reflective/transmissive optic 24 is used, light forming the source object should be incident on the coating 24 at an angle ($\theta_{SO}$) that is greater than $\theta_{i1}$ angle for the coating. Since the $\theta_{i1}$ angle is generally about 20°, $\theta_{SO}$ is preferably greater than 20°, preferably between about 25° and 50°, and most preferably about 36°. At larger angles, significant aberrations in the compound magnified image are produced.

Light 39 forming the source object 14 is preferably incident on the first magnification optic 26 at an angle such that the light 35 forming the magnified virtual image 40 is substantially perpendicular to the reflective/transmissive optic 24 ($\theta_{MVI}=0°$). In order to accomplish this, the normal 31 to the first magnification optic 26 is preferably at an angle ($\theta_{FMO}$) relative to the normal 37 to the reflective/transmissive optic 19 that is half the angle of incidence of the light forming the source object on the reflective/transmissive optic 19 ($\theta_{SO}$). Since $\theta_{SO}$ is generally about 25°, $\theta_{FMO}$ is preferably between about 10° and 20°, and most preferably about 18°.

As illustrated in FIG. 3, the display input surface 22 in this embodiment can be angled to be approximately parallel to reflective/transmissive surface 24. This has the desirable advantage of enabling the display input surface 22 and reflective/transmissive surface 24 to be coated at the same time. The normal to the reflective surface 28 forms an angle $\theta_{RS}$ with respect to the microdisplay 12 and the reflective/transmissive surface 24. The preferred angle $\theta_{RS}$ is based on the location of the microdisplay 12, the display input surface 22, and the reflective/transmissive surface 24. In a preferred embodiment where the display input surface 22 is coincident with the reflective/transmissive optical surface 24, the angle $\theta_{RS}$ can be calculated as $\theta_{SO}/2$.

In all of the embodiments the angle ($\theta_{MD}$) between the normal 15 to the microdisplay 12 and the path of the light forming the source object 14 can be modified for the purpose of optical correction and illumination efficiency as will be discussed in the following examples. In FIG. 3, modifying the angle $\theta_{MD}$ can effect the angle $\theta_{RS}$ as predicted by the physics of optical propagation.

Figure 5:
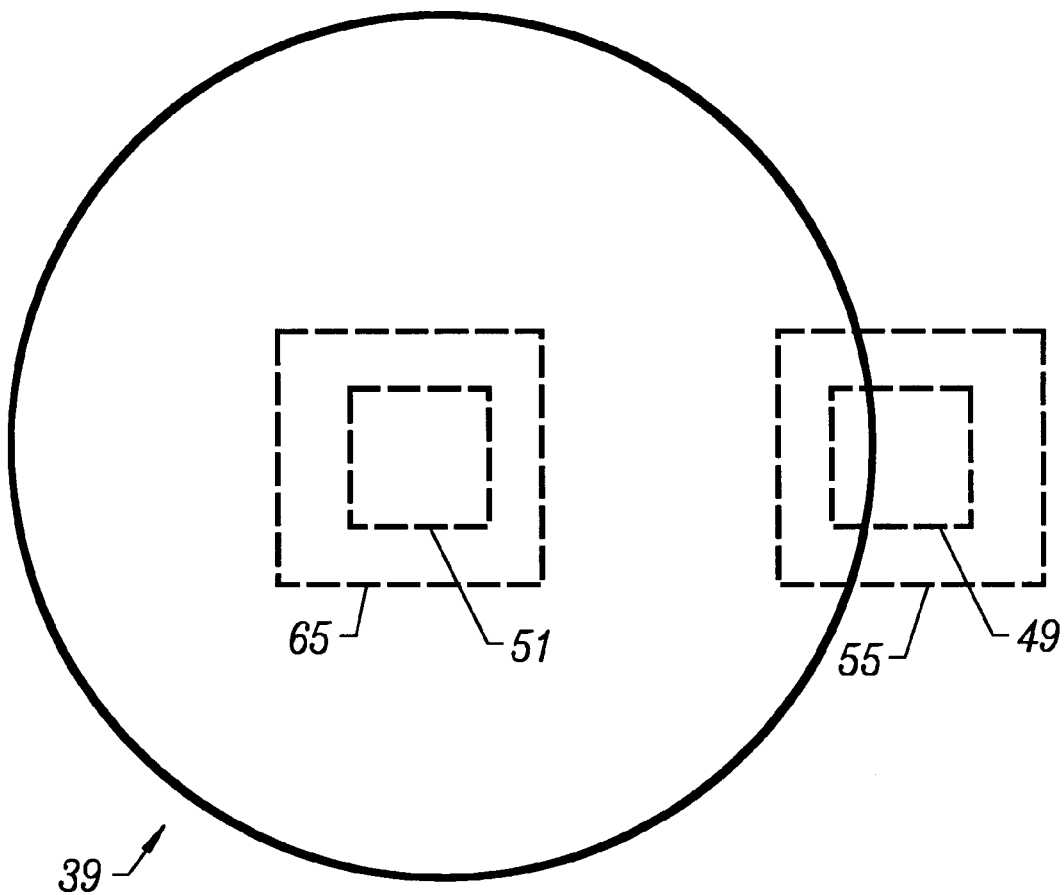
FIG. 5 illustrates the relative alignment of the first and second magnification optics.

As illustrated in FIG. 5, the relative alignment of the first and second magnification optics in the embodiments illustrated in FIGS. 1–3, is such that the area 27 is at least partially within 49 the full field of view 39 provided by the display system and in some instances is completely within 51 the full field of view 39. The relative alignment of the first and second magnification optics may also be such that the area 53 on the first magnification optic onto which the source object is projected is at least partially within 55 the full field of view provided by the display system and in some instances is completely within 65 the full field of view.

With regard to all of the above embodiments, the display systems preferably provides an eye relief equal to or greater than about 15 mm, more preferably equal to or greater than about 25 mm, most preferably equal to or greater than about 35 mm. The display system also preferably provides an image which is at least equivalent in size to a computer monitor (24 cm×18 cm) when viewed at 55 cm. This size is roughly equivalent to a large screen TV (100 cm diagonal) when viewed at 180 cm. The display system also preferably provides about a 30° field of view (15° to either side of the central optical axis).

With regard to all of the above embodiments, the first magnification optic preferably has a magnification of between about 3 and 10 and a focal length between about 83 and 25 mm. The second magnification optic preferably has a magnification of between about 3 and 10 and a focal length between about 83 and 25 mm. It is also preferred that the eye relief provided by the second magnification optic be equal to or greater than about 15 mm, more preferably equal to or greater than about 25 mm, most preferably equal to or greater than about 35 mm.

The first magnification optic and the second magnification optic may also be designed to introduce field curvature into the magnified virtual image 40 and the compound magnified virtual image 42 respectively such that a complementary degree of positive and negative field curvature is introduced by each optic. Accordingly, it is particularly preferred that the first and second magnification optics be selected such that the first and second magnification optics act in concert to substantially eliminate any field curvature introduced by either magnification optic individually. Elimination of field curvature in this manner can be performed regardless of whether the microdisplay 12 is positioned near the first magnification surface 26 or the reflective/transmissive surface 24.

With regard to all of the above-described embodiments, the first magnification surface, the transmissive/reflective surface, and the second magnification optic may be formed from non-rotationally symmetric surfaces with respect to the optical axis of the system to provide for greater correction of the aberrations present in the system. In addition, the surfaces may be decentered and tilted with respect to the central optical axis to provide for greater correction of the aberrations present in the system. The display input surface of the microdisplay may be tilted and displaced to provide for greater correction of the aberrations present in the system.

With regard to the embodiment illustrated in FIG. 3, the second reflective surface may have a non-rotationally symmetric surface. The above mentioned aberrations include, but are not limited to spherical aberrations, astigmatism, coma, distortion and field curvature.

With regard to all of the above-described embodiments, the first and second magnification optics can be used to magnify the source object 14 formed by the microdisplay 12 by a factor equal to or greater than about 10 and more preferably equal to or greater than a factor of about 20. By using two separate magnification optics, the display of the present invention is able to employ smaller components and a more compact layout than would be possible using a single magnification optic, thereby enabling the display to be positioned within a compact space. In addition, by employing two stages of magnification, the degree of magnification needed in the second stage is reduced which, in turn, provides the observer with a wider field of view and longer eye relief as compared to high powered magnifying lens. In addition, the second magnification optic can be focused at a point near infinity which reduces the amount of eye strain caused when the observer focuses his or her eyes on the synthesized display.

In a preferred embodiment of the display illustrated in FIG. 1, the display system has a field of view of 30°. The eye relief (ER) is 25 mm to the designed pupil and the maximum untruncated eye relief (UER) is 40 mm. The designed pupil of the system is 10 mm to allow for translation of the optical system with respect to the eye. The first magnification optic 20 is formed of polycarbonate and the second magnification optic 30 is formed of TOPAZ plastic. The microdisplay 12 is illustrated as being in optical contact with the display input surface 22. The microdisplay may optionally have a 1 mm thick cover glass formed from BK7. The microdisplay 12 is flat and approximately 13 mm diagonal with a 3 by 4 aspect ratio.

Three techniques have been incorporated into this embodiment of the display to correct for aberrations introduced by an off axis first magnification surface 26. First, both the first magnification surface 26 and the transmissive/reflective surface 24 are non-rotationally symmetric surfaces. The second magnification optic 30 is displaced with respect to the optical axis of the system. The microdisplay 12 is tilted with respect to the optical axis.

The second magnification optic consists of two surfaces, S1 and S2 and both are standard aspheric surfaces where the surface sag is described by the following equation.

$$z_{asp} = r^2/(R^2(1-(1+k)r^2)^{1/2}) + \alpha_2 r^2 + \alpha_4 r^4 + \alpha_6 r^6 + \alpha_8 r^8$$

where:

$z_{asp}$ is the surface sag, R is the radius of curvature, r is the local center of rotation, k is the conic constant, and the coefficients $\alpha_n$ are the coefficients of the asphere to the power n.

The following table lists the coeffcients of the aspheric surface for the second magnification optic.

|    | R | k | $\alpha_2$ | $\alpha_4$ | $\alpha_6$ | $\alpha_8$ |
|----|---|---|-----|-----|-----|-----|
| S1 | $1.036 \times 10^2$ | -35.25 | $1.108 \times 10^{-3}$ | $-1.071 \times 10^{-5}$ | $1.746 \times 10^{-8}$ | $-6.943 \times 10^{-12}$ |
| S2 | $-3.108 \times 10^1$ | -0.2395 | $9.444 \times 10^{-4}$ | $-1.368 \times 10^{-6}$ | $1.442 \times 10^{-8}$ | $6.250 \times 10^{-13}$ |

*Surface S1 is proximal to the observer and surface S2 is distal to the observer.

The local center of the first magnification optic is preferably displaced with respect to the optical axis by a distance y=5.051 mm.

The first magnification optical surface and the reflective/transmissive optical surfaces are both Zernike surfaces where the surface sag is described by the following equation.

$$z_{Zern} = z_{asp} + \sum_0^n A_n Z_n(\rho, \theta)$$

where, $z_{Zern}$ is the surface sag, $z_{asp}$ is the aspheric surface sag, $A_n$ is the coefficient for the $n^{th}$ Zernike polynomial, and $Z_n$ is the $n^{th}$ Zernike polynomial as a function of $\rho$ and $\theta$, $\rho$ is a normalized radius=$r/r_n$, and $\theta$ is angle with respect to the y direction in the local x, y plane of the optic.

|    | R | k | $\alpha_2$ | $\alpha_4$ | $\alpha_6$ | $\alpha_8$ |
|----|---|---|-----|-----|-----|-----|
| M1 | $-1.088 \times 10^2$ | 6.193 | $-3.217 \times 10^{-6}$ | $-3.217 \times 10^{-6}$ | $3.185 \times 10^{-10}$ | 0 |
| R/T | $1 \times 10^{10}$ | 0 | $-1.309 \times 10^{-3}$ | $-4.1355 \times 10^{-5}$ | $-2.064 \times 10^{-9}$ | $7.355 \times 10^{-12}$ |

|    | $r_n$ | $A_3$ | $A_4$ | $A_6$ | $A_8$ | $A_{11}$ | $A_{13}$ |
|----|-------|------|------|------|------|--------|--------|
| M1 | 101.52 | -5.5 | $-4.066 \times 10^{-1}$ | $3.881 \times 10^{-3}$ | 2.147 | $6.75 \times 10^{-1}$ | $1.665 \times 10^{-3}$ |
| R/T | 97.81 | 0 | $-3.145 \times 10^2$ | 4.460 | 1.259 | 0 | 2.966 |

The following is a table showing the Zernike polynomial functions associated with the Zernike coefficients used in the above table.

| | |
|---|---|
| $Z_3$ | $2\rho^2 - 1$ |
| $Z_4$ | $\rho^2 \cos(\theta)$ |
| $Z_6$ | $(3\rho^2 - 2)\rho\cos\theta$ |
| $Z_8$ | $6\rho^4 - 6\rho^2 + 1$ |
| $Z_{11}$ | $(4\rho^2 - 3)\rho^2 \cos 2\theta$ |
| $Z_{13}$ | $(10\rho^4 - 12\rho^2 + 3)\rho\cos\theta$ |

The optical design for this example has reflection symmetry in the y-z plane, thus the coordinates in the y-z plane of the local centers of rotation for the various surfaces and the tilt angles in this plane are all information needed to complete the optical prescription of this design. The coordinate system is measured with respect to the design pupil of 25 mm from the front of the second magnification optic The following table lists the global coordinates and the tilt angles for the optical surfaces.

|    | y | z | angle |
|----|------|------|--------|
| S1 | 5.051 | 25.0 | 0.00 |
| S2 | 5 | 30.0 | 0.00 |
| M1 | 0.00 | 35.0 | 20 |
| T/R | -4.196 | 30.0 | 0.00 |
| Display Input | -13.195 | 40.725 | -23.524 |
| Microdisplay | -13.59 | 41.642 | -23.524 |

The display coordinates do not include a displacement of the center of the display relative to the display coordinates due to the cumulative effects of the off axis corrections for the aberrations.

The angles for the optical system relative to the performance of the reflective transmissive optic and the final tilt of the microdisplay are calculated and listed in the following table.

| | |
|---|---|
| $\theta_{FMO}$ | 20.0 |
| $\theta_{SO}$ | 40.0 |
| $\theta_{MVI}$ | 0.00 |
| $\theta_{MD}$ | -16.462 |

Figure 6:
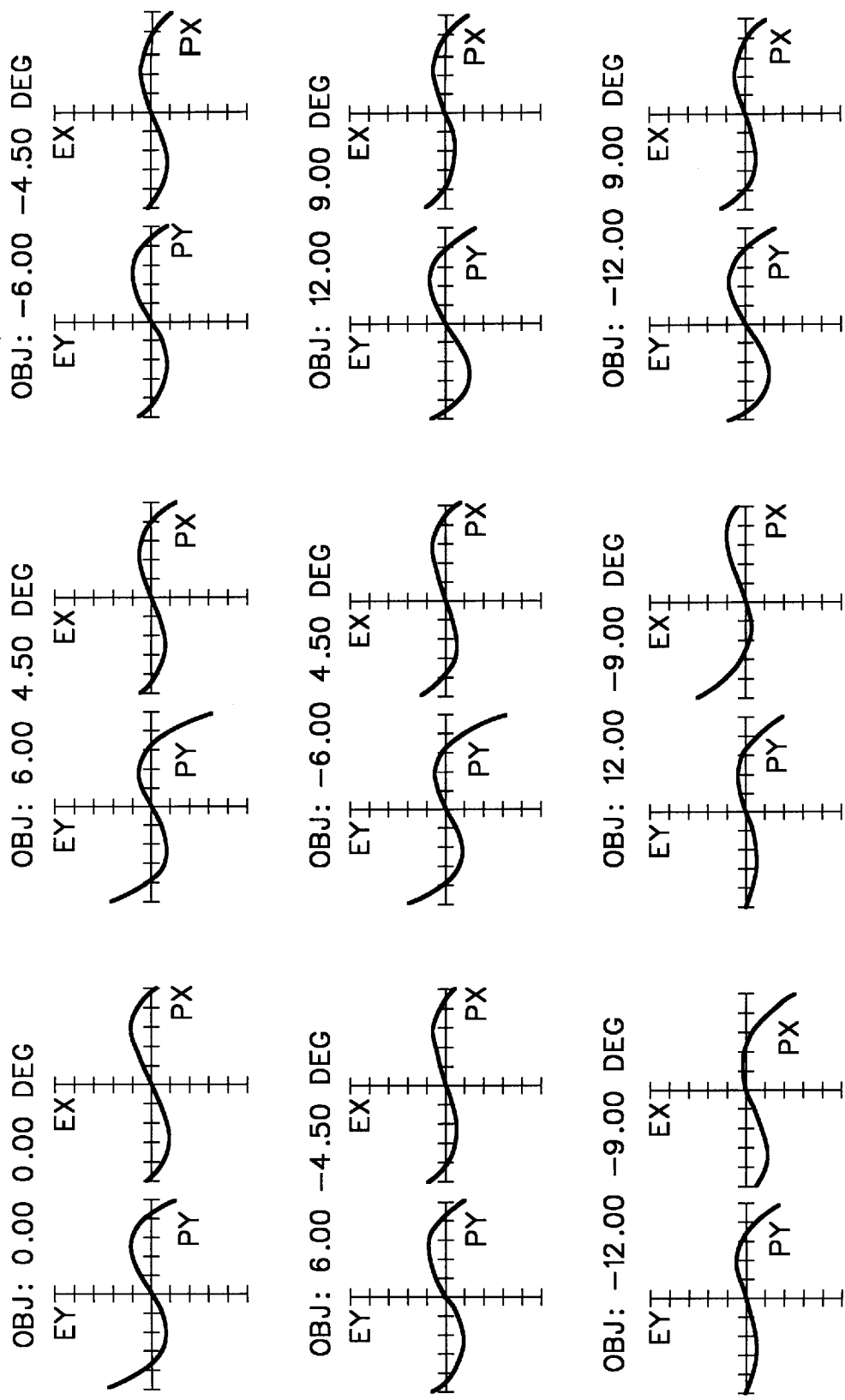
FIG. 6 shows the optical performance for this example using a ray fan plot.

FIG. 6 shows the optical performance for this example using a ray fan plot. The performance is for both the sagittal and tangential planes for nine field points corresponding to the center of the display, the corners of the display and half way to the corners of the display. As can be seen from FIG. 6, the optical quality of the image produce is acceptable for use in a 800×600 resolution display over the entire exit pupil.

Figure 7:
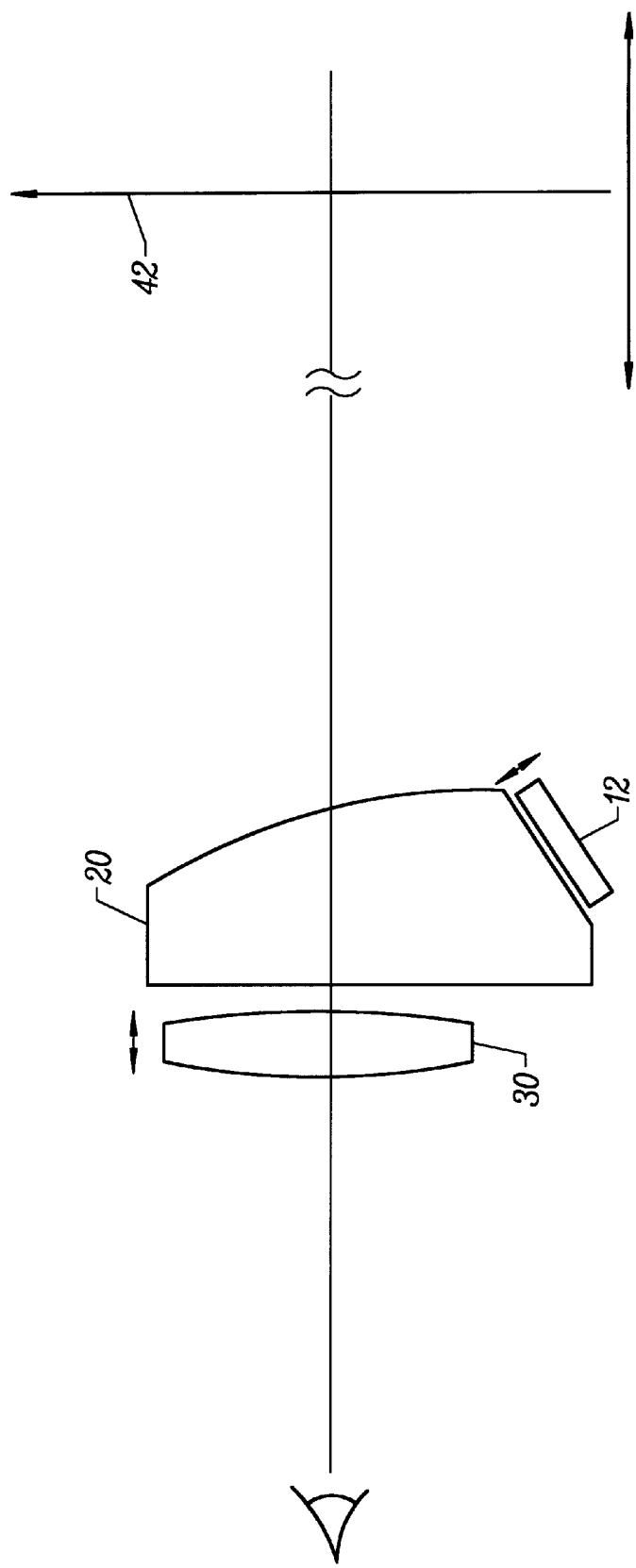
FIG. 7 illustrates that the microdisplay and/or the second magnification optic can be designed to move toward or away from the first magnification optic in order to adjust the appearance of the position of the compounded magnified virtual image to the observer.

With regard to all of the above-described embodiments, the display system can be modified to change the apparent distance between the observer and the magnified virtual image by modifying the separation between the first and second magnification optics. As illustrated in FIG. 7, the microdisplay 12 and/or the second magnification optic 30 can move toward or away from the first magnification optic 20 in order to adjust the appearance of the position of the compounded magnified virtual image to the observer.

When the display system is in a contracted state, i.e, when the microdisplay 12 and/or the second magnification optic 30 is moved to be adjacent the first magnification optic 20, the apparent distance between the observer and the compound magnified virtual image 42 is minimized. As the microdisplay 12 and/or the second magnification optic 30 is moved away from the first magnification optic 20, the apparent distance between the compound magnified virtual image 42 and the observer increases. The adjustability of the separation between the first magnification optic 20 and the second magnification optic 30 thus provides the observer with the ability to adjust the apparent distance to the virtual image and ergonomics of the display system.

According to this embodiment, the display system includes a distance adjusting mechanism which adjusts the distance between the first and second magnification optics. The distance adjusting mechanism may be controlled by the observer and/or a control mechanism which adjusts the distance in relation to the images contained in the source object.

Modulation of the source object may be performed automatically or in response to a control signal provided by the observer (e.g., the observer presses a button). For example, the display system may include a control mechanism which enables the observer to modify the size of the source object by sending a control signal to the control device.

Modulation of the magnification and focus of the display system may be performed automatically or in response to a control signal provided by the observer. For example, the display system may include a control mechanism which enables the observer to control the distance adjusting mechanism, thereby controlling the distance between the first and second magnification optics.

The microdisplay used in the display system of the present invention may be any electronically activated display which can produce a source object of any type. For example, the microdisplay may be a liquid crystal display, a spatial light modulator, a grating, a mirror light valve or a LED array. Microdisplays may generally divided into two categories, opaque and light transmissive displays. Opaque microdisplays can be further divided into reflective, emissive and scattering microdisplays.

Transmissive microdisplays can be used with an illumination source which is position behind the microdisplay and transmits light through the microdisplay to the first magnification optic. It is preferred that the transmissive microdisplay be directly adjacent the first magnification optic.

Emissive opaque microdisplays emit their own light and thus do not require an external light source. It is preferred that the emissive microdisplay be directly adjacent the first magnification optic.

Figure 8:
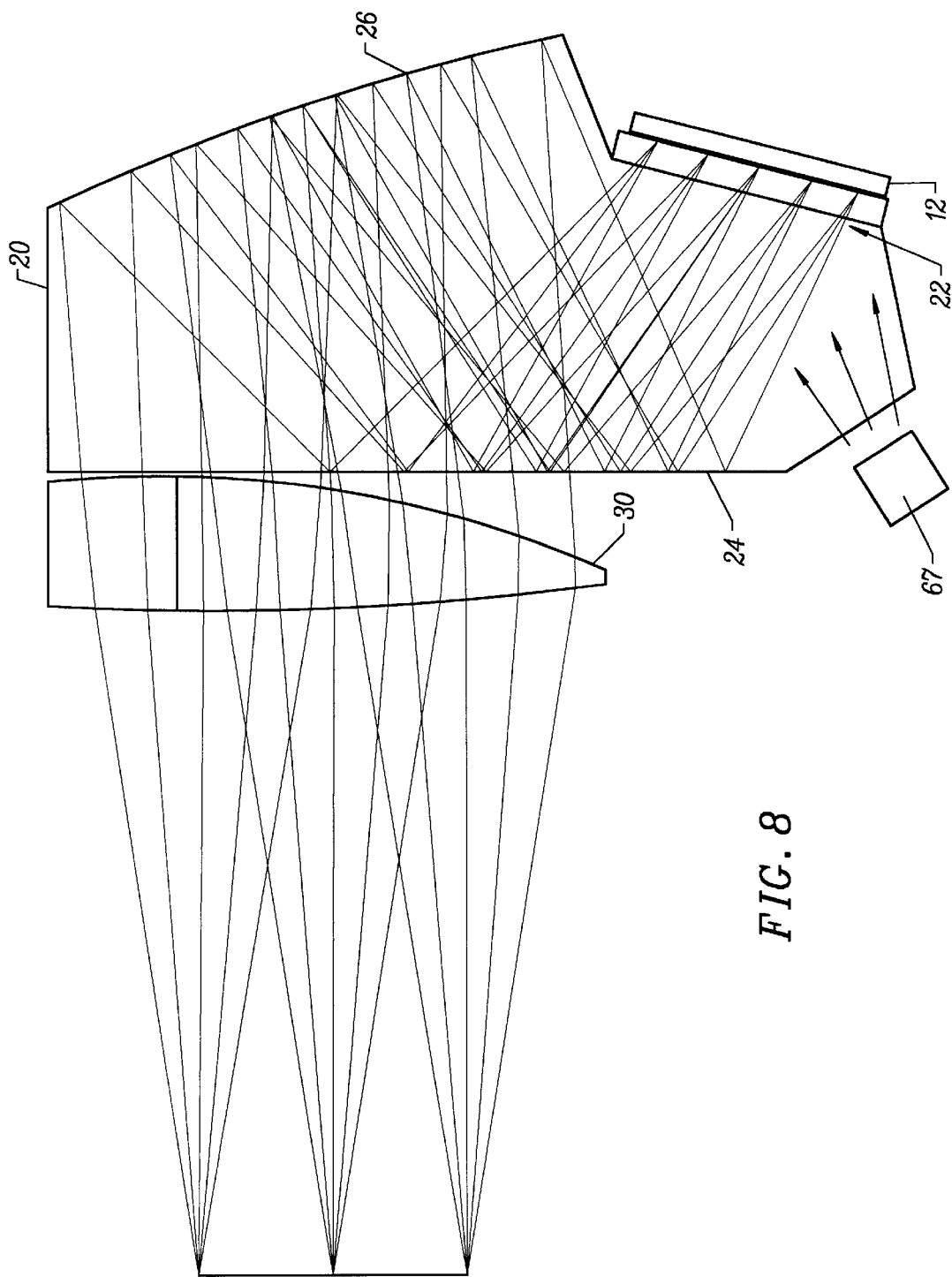
FIG. 8 illustrates a preferred embodiment of a display in which a scattering opaque microdisplay is employed in combination with an illumination source.

Reflective and scattering microdisplays require an external light source which directs light to a front surface of the microdisplay which redirects the light toward the first magnification optic. With regard to scattering microdisplays, illumination is preferably directed off-axis relative to the surface of the microdisplay. FIG. 8 illustrates a preferred embodiment of a display in which a scattering opaque microdisplay is employed in combination with an illumination source 67. A polymer dispersed liquid crystal on a silicon chip is an example of a preferred scattering opaque microdisplay.

Figure 9:
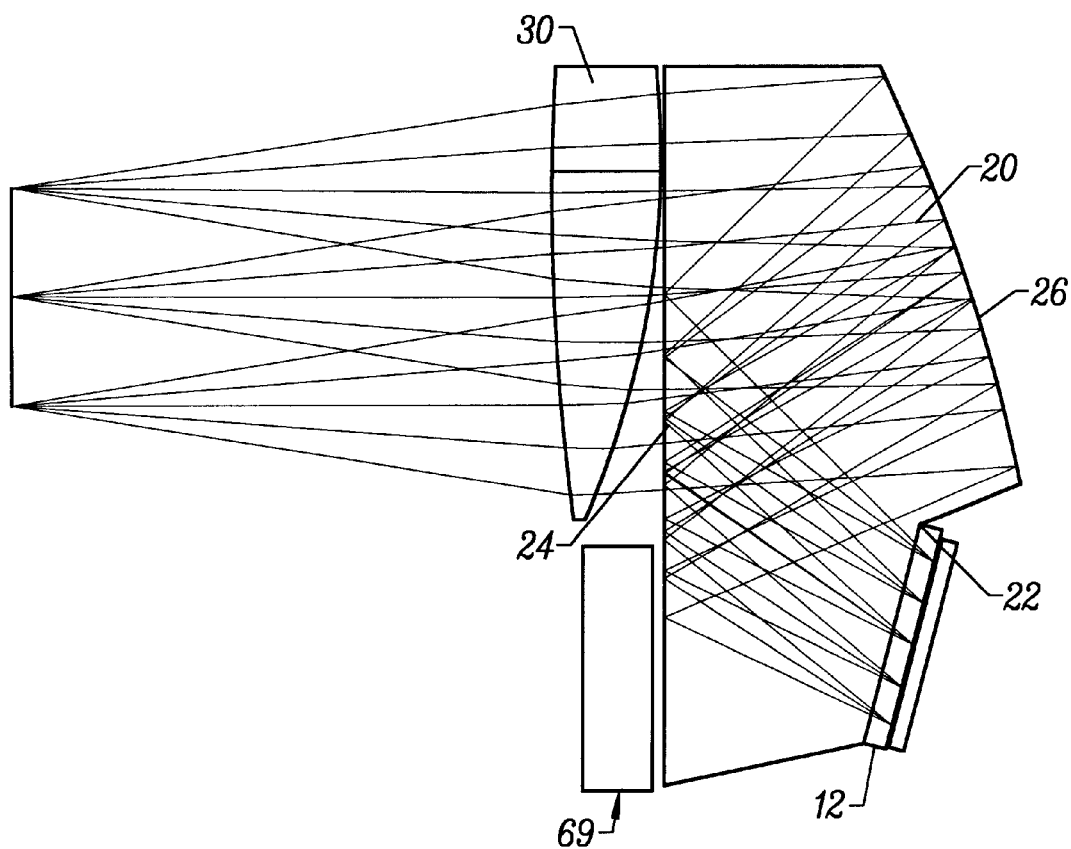
FIG. 9 illustrates a preferred embodiment of a display in which a reflective microdisplay is employed in combination with an illumination source.

With regard to reflective microdisplays, illumination is preferably directed relative to the surface of the microdisplay so that the light reaches the observer. A nematic liquid crystal on a silicon chip is an example of a preferred reflective microdisplay. FIG. 9 illustrates a preferred embodiment of a display in which a reflective microdisplay is employed in combination with an illumination source 69.

As can be seen from the ray paths shown in the figure, the positioning and angling of the optical surfaces and the second magnification optic enable the illumination source can be positioned outside of the footprint of the second magnification optic and still effectively direct light to the exit pupil without the introduction of significant aberrations into the image and without using any additional beamsplitting elements to direct light to the microdisplay. As also illustrated in the figure, the illumination source can be positioned in this design such that the thickness and length of the display is not increased by the illumination source.

The microdisplay preferably forms a source object having an area equal to or less than 400 mm$^2$. The microdisplay is also preferably formed of an array of pixels where each pixel has an area equal to or less than about 0.25 mm$^2$. However, it should be understood that microdisplays which can produce larger source objects may be employed. It is also preferred that the microdisplay form a source object using an array of pixels on the microdisplay wherein each pixel has an area equal to or less than about 1600 square microns, more preferably equal to or less than about 25 square microns.

One of the significant advantages of employing a reflective first magnification optic where the optical train of the display system is folded onto itself is the increased light efficiency that is achieved. Beam splitters and/or optical gratings are typically used in conjunction with reflective optics in prior art display systems. However, by eliminating the need for a beam splitter or an optical grating in the display system of the present invention, the light efficiency of the display is significantly increased. As a result, the ultimate brightness of the compound magnified virtual image seen by the observer is enhanced. Further, because the display system is designed to direct most of the imaging light toward the observer's eye, the amount of light needed to illuminate the exit pupil of the device is significantly smaller than in traditional displays.

Figure 10:
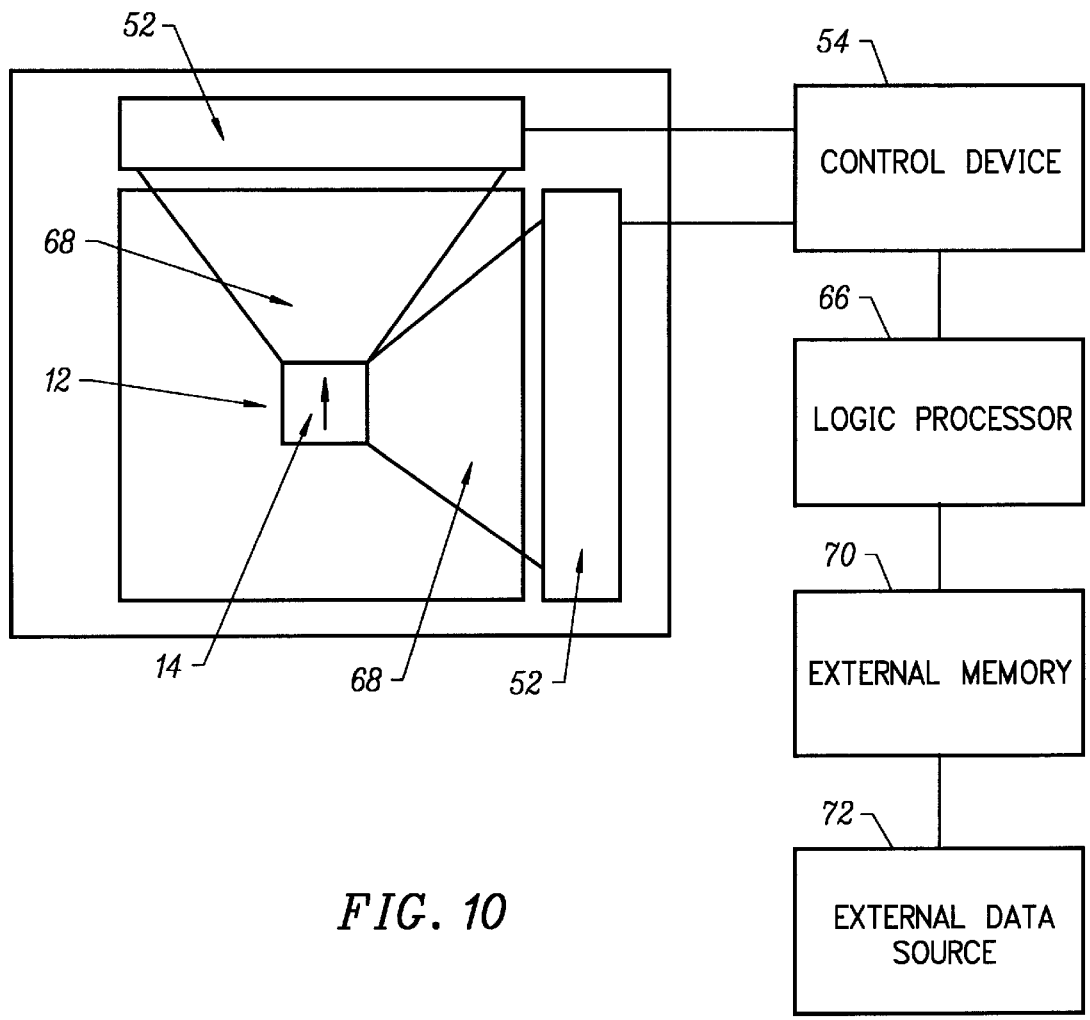
FIG. 10 illustrates electronics which may be included within the display system for controlling the microdisplay.

FIG. 10 illustrates electronics which may be included within the display system for controlling the microdisplay 12. As illustrated in FIG. 10, the microdisplay 12 includes an input 52 which is electronically attached by electrodes 68 to the microdisplay 12. Also connected to the input 52 is a control device 54 for conveying electrical signals through the input to control the generation of the source object 14. The control device 54 may also be connected to a logic processor 66 which is also connected to external memory 70 which may be controlled through an external data source 72. In a preferred embodiment, the microdisplay 12 is a row-column addressed display system. The microdisplay 12 is connected to the input 52 such as shift registers through optically transparent electrodes 68 such as indium tin oxide or any other suitable optical transparent conducting material. The input 52, shift registers are connected to a control device 54 such as a character generator with timing and decoding logic. The control device 54 is controlled by a processor 66 which manipulates the data from the external memory 70. The external memory receives the information from the external data source 72 such as an external radio receiver. The external data source 72 could also be infrared diode data link to another computer, LAN system, or any other device capable of sending analog or digital communications. In a preferred embodiment, the external memory 70 and external data source 72 is a separate PCMCIA card which can be connected to a computer or communication system.

Electronic devices using the display system of the present invention will generally be portable. Given that the illumination source used in the display system generally requires the greatest amount of energy of the various components used in a display system, efficient use of illumination is very important. Embodiments where illumination is efficiently used significantly increase the lifetime of the power supply used to energize the display system.

In a further, preferred embodiment, the display system includes an eye position sensor system which enables the observer to use his or her eye to interact with a control device. Through this interaction, the eye position sensor system may be used to control the source object produced by the microdisplay. The eye position sensor system may also be used to control a variety of functions performed by the display system, for example, directing a printer to print a document or directing a facsimile machine to send a message. According to this embodiment, the position of the observer's eye is detected and used, much like a cursor, to interact with the controlling device to control the source object produced by the microdisplay.

Devices, such as eye trackers and occulometers, for detecting the position of the eye, are well known in the art. For example, suitable devices which may be used in conjunction with the virtual mouse sensor system include the devices described in U.S. Pat. No. 4,513,317 which is incorporated herein by reference. United Kingdom Patent Application GB 2270171A also describes an occulometer which may be used with the virtual mouse sensor system.

Figure 11:
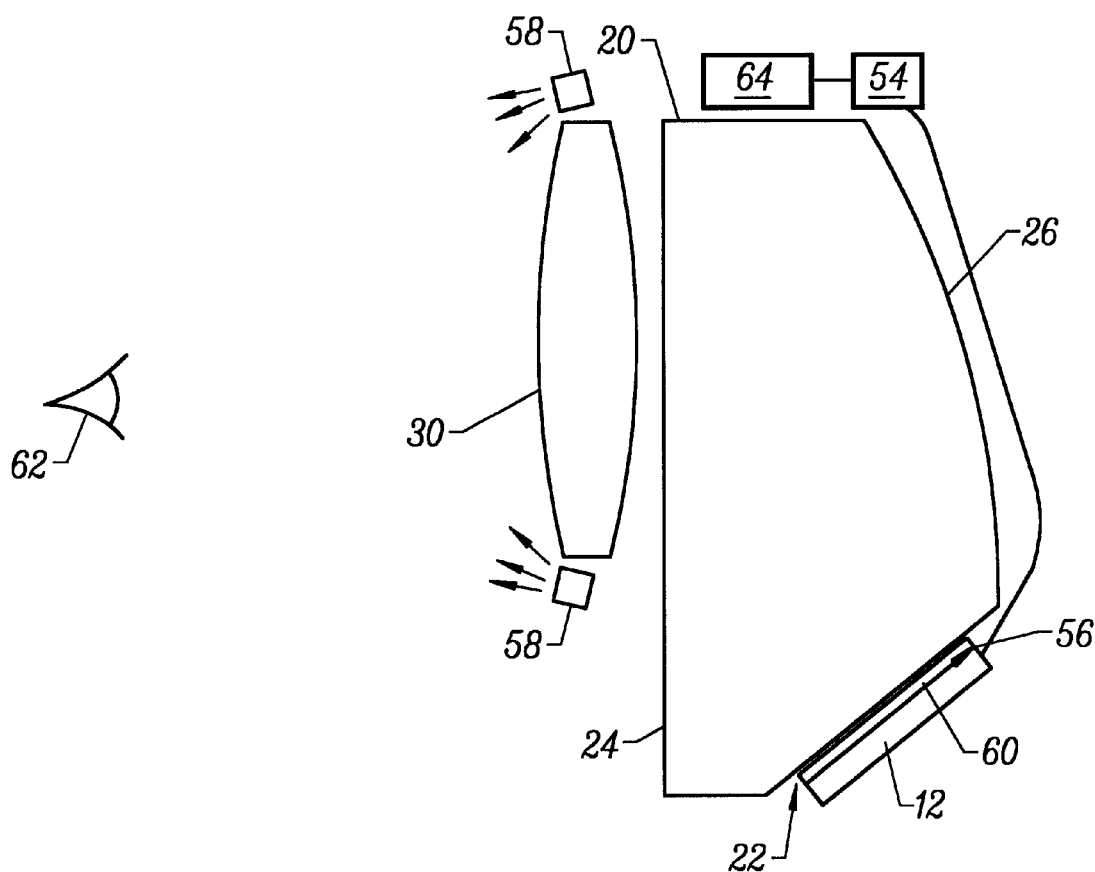
FIG. 11 illustrates an embodiment of the display system which includes an eye position sensor system which enables the observer to use his or her eye to interact with a control device which controls the source object produced by the microdisplay and/or functions that the display system performs.

In one embodiment illustrated in FIG. 11, the eye position sensor system includes a light emitting diode (LED) 58 positioned around the perimeter of the second magnification optic 30 for providing illumination in the direction of the observer's eye. The illumination is preferably in the infrared region. The eye position sensor system 56 also includes a detector array 60 positioned adjacent to the microdisplay for detecting reflections of the illumination from the LED 58 off of the retina 62 of the observer's eye, the reflections serving to indicate the position of the observer's eye. The eye position sensor system 56 also includes a control mechanism 64 which the observer uses in combination with the detector array 60 to interact with the controlling device 54 to control the source object 14 produced by the microdisplay 12.

The control mechanism 64 may be, for example, a button which the observer depresses to indicate that the observer is looking at a selected item, such as a computer software icon. The control mechanism 64 may also be a timing mechanism which determines that the observer has selected an item based on the amount of time that the observer is looking in a particular direction.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A compact virtual image display system comprising:
   a microdisplay for forming a source object;
   a first magnification optic positioned such that light forming the source object enters the first magnification optic, the optic including
      a reflective/transmissive surface positioned such that light forming the source object travels within the first magnification optic to the reflective/transmissive surface where the source object is reflected by the reflective/transmissive surface, at least a portion of the reflected source object being totally internally reflected, and
      a reflective first magnification element surface positioned such that the reflected source object is magnified and reflected back to the reflective/transmissive surface as a magnified virtual image and transmitted though the reflective/transmissive surface;
   and
   a second magnification optic positioned relative to the first magnification optic to magnify the magnified virtual image.

2. The compact virtual image display system according to claim 1 wherein the reflective first magnification element surface magnifies the source object between about 3 and 10 times.

3. The compact virtual image display system according to claim 1 wherein the reflective first magnification element surface has a focal length between about 83 and 25 mm.

4. The compact virtual image display system according to claim 1 wherein the second magnification optic magnifies the magnified virtual image between about 3 and 10 times.

5. The compact virtual image display system according to claim 1 wherein the second magnification optic has a focal length between about 83 and 25 mm.

6. The compact virtual image display system according to claim 1 wherein the first and second magnification optics are separated from each other by less than about 15 mm.

7. The compact virtual image display system according to claim 1 wherein the first and second magnification optics are separated from each other by less than about 8 mm.

8. The compact virtual image display system according to claim 1 wherein the first and second magnification optics are selected such that the first and second magnification optics act in concert to substantially eliminate any field curvature introduced by either magnification optic individually.

9. The compact virtual image display system according to claim 1 wherein one or more of the reflective first magnification element surface and the transmissive/reflective surface are formed from non-rotationally symmetric surfaces with respect to an optical axis of the system.

10. The compact virtual image display system according to claim 1 wherein one or more of the reflective first magnification element surface, the transmissive/reflective surface and the second magnification optic are decentered and tilted relative to an optical axis of the system.

11. The compact virtual image display system according to claim 1 wherein the microdisplay is transmissive.

12. The compact virtual image display system according to claim 1 wherein the microdisplay is opaque.

13. The compact virtual image display system according to claim 1 wherein the microdisplay is reflective.

14. The compact virtual image display system according to claim 1 wherein the microdisplay is emissive.

15. The compact virtual image display system according to claim 1 wherein the microdisplay is scattering.

16. The compact virtual image display system according to claim 1 wherein the microdisplay forms a source object having an area equal to or less than 400 $mm^2$.

17. The compact virtual image display system according to claim 1 wherein the microdisplay is formed of an array of pixels where each pixel has an area equal to or less than about 0.25 $mm^2$.

18. The compact virtual image display system according to claim 1 wherein the display system has a thickness, as measured from a surface of the first magnification optic facing away from the second magnification optic to a surface of the second magnification optic facing away from the first magnification optic, which is equal to or less than about 20 mm.

19. The compact virtual image display system according to claim 1 wherein one of the first and second magnification optics reduce a degree of field curvature introduced by the other magnification optic.

20. The compact virtual image display system according to claim 1 wherein the light forming the source object reflects off an area of the reflective/transmissive surface that is at least partially within the full field of view provided by the second magnification optic.

21. A compact virtual image display system comprising:
a microdisplay for forming a source object;
a first magnification optic positioned such that light forming the source object enters the first magnification optic, the optic including
a reflective/transmissive surface positioned such that light forming the source object travels within the first magnification optic to the reflective/transmissive surface where the source object is reflected by the reflective/transmissive surface, and
a reflective first magnification element surface positioned such that the reflected source object is magnified and reflected back to the reflective/transmissive surface as a magnified virtual image and transmitted though the reflective/transmissive surface;
a second magnification optic positioned relative to the first magnification optic to magnify the magnified virtual image; and
a reflective surface positioned in a light path between the microdisplay and the reflective/transmissive surface such that light forming the source image from the microdisplay is reflected off the reflective surface to the reflective/transmissive surface.

22. The compact virtual image display system according to claim 21 wherein the reflective surface positioned in a light path between the microdisplay and the reflective/transmissive surface is a separate optical element from the first magnification optic.

23. The compact virtual image display system according to claim 21 wherein the reflective surface positioned in a light path between the microdisplay and the reflective/transmissive surface is an interior surface of the first magnification optic.

24. The compact virtual image display system according to claim 21 wherein at least a portion of the light reflected by the reflective/transmissive surface is totally internally reflected.

25. A compact virtual image display system comprising:
a microdisplay for forming a source object;
a first magnification optic positioned such that light forming the source object enters the first magnification optic, the optic including
a reflective/transmissive surface positioned such that light forming the source object travels within the first magnification optic to the reflective/transmissive surface where the source object is reflected by the reflective/transmissive surface, and
a reflective first magnification element surface positioned such that the reflected source object is magnified and reflected back to the reflective/transmissive surface as a magnified virtual image and transmitted though the reflective/transmissive surface;
and
a second magnification optic positioned relative to the first magnification optic to magnify the magnified virtual image and form a compound virtual image;
wherein an angle between a normal to the reflective first magnification element surface and a normal to a center of the compound virtual image is between about 10° and 25°.

26. The compact virtual image display system according to claim 25 the angle between the normal to the reflective first magnification element surface and the normal to the center of the compound virtual image is about 18°.

27. The compact virtual image display system according to claim 25 wherein at least a portion of the light reflected by the reflective/transmissive surface is totally internally reflected.

28. A compact virtual image display system comprising:
a microdisplay for forming a source object;
a first magnification optic positioned such that light forming the source object enters the first magnification optic, the optic including
a reflective/transmissive surface positioned such that light forming the source object travels within the first magnification optic to the reflective/transmissive surface where the source object is reflected by the reflective/transmissive surface, and
a reflective first magnification element surface positioned such that the reflected source object is magnified and reflected back to the reflective/transmissive surface as a magnified virtual image and transmitted though the reflective/transmissive surface;
and
a second magnification optic positioned relative to the first magnification optic to magnify the magnified virtual image;
wherein the light forming the source object is incident on the reflective/transmissive surface at an angle greater than about 20°.

29. The compact virtual image display system according to claim 28 wherein the light forming the source object is incident on the reflective/transmissive surface at an angle between about 25° and 50°.

30. The compact virtual image display system according to claim 28 wherein the light forming the source object is incident on the reflective/transmissive surface at about 36°.

31. The compact virtual image display system according to claim 28 wherein at least a portion of the light reflected by the reflective/transmissive surface is totally internally reflected.

32. A compact virtual image display system comprising:
a microdisplay for forming a source object;
a first magnification optic positioned such that light forming the source object enters the first magnification optic, the optic including
a reflective/transmissive surface having a reflective coating and positioned such that light forming the source object travels within the first magnification optic to the reflective/transmissive surface where a first portion of the source object is reflected by the coating and a second portion of the source object is totally internally reflected by the reflective/transmissive surface, and
a reflective first magnification element surface positioned such that the reflected source object is magnified and reflected back to the reflective/ transmissive surface as a magnified virtual image and transmitted though the reflective/transmissive surface;

and a second magnification optic positioned relative to the first magnification optic to magnify the magnified virtual image.

33. The compact virtual image display system according to claim 32 wherein the reflective coating is a dielectric coating.

34. The compact virtual image display system according to claim 32 wherein the reflective coating is reflective to light at an angle of incidence greater than about the product of 30° divided by an index of refraction of the first magnification optic.

35. The compact virtual image display system according to claim 32 wherein light forming the source object is incident on the coating at an angle greater than about 20°.

36. The compact virtual image display system according to claim 32 wherein light forming the source object is incident on the coating at an angle between about 25° and 50°.

37. The compact virtual image display system according to claim 32 wherein light forming the source object is incident on the coating at about 36°.

38. A compact virtual image display system comprising:

a microdisplay for forming a source object;

a first magnification optic positioned such that light forming the source object enters the first magnification optic, the optic including a reflective/transmissive surface positioned such that light forming the source object travels within the first magnification optic to the reflective/transmissive surface where the source object is reflected by the reflective/transmissive surface, and a reflective first magnification element surface positioned such that the reflected source object is magnified and reflected back to the reflective/transmissive surface as a magnified virtual image and transmitted though the reflective/transmissive surface;

and a second magnification optic positioned relative to the first magnification optic to magnify the magnified virtual image;

wherein one or more of the reflective first magnification element surface, the transmissive/reflective surface and the second magnification optic are decentered and tilted relative to an optical axis of the system.

39. The compact virtual image display system according to claim 38 wherein the first and second magnification optics are selected such that the first and second magnification optics act in concert to substantially eliminate any field curvature introduced by either magnification optic individually.

40. The compact virtual image display system according to claim 38 wherein one or more of the reflective first magnification element surface and the transmissive/reflective surface are formed from non-rotationally symmetric surfaces with respect to an optical axis of the system.

41. The compact virtual image display system according to claim 38 wherein the microdisplay forms a source object having an area equal to or less than 400 mm$^2$.

42. The compact virtual image display system according to claim 38 wherein the microdisplay is formed of an array of pixels where each pixel has an area equal to or less than about 0.25 mm$^2$.

* * * * *